United States Patent
Wampler et al.

(10) Patent No.: US 8,296,923 B2
(45) Date of Patent: Oct. 30, 2012

(54) MODULAR NUMERICALLY CONTROLLED SYSTEM

(75) Inventors: Robert Ray Wampler, Augusta, KS (US); Muhammad Zia Ullah, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 1323 days.

(21) Appl. No.: 11/947,488

(22) Filed: Nov. 29, 2007

(65) Prior Publication Data

US 2009/0143207 A1 Jun. 4, 2009

(51) Int. Cl.
*B23P 23/00* (2006.01)
*B29C 70/34* (2006.01)
*B29C 70/38* (2006.01)

(52) U.S. Cl. ............ 29/560; 483/16; 483/901; 409/212; 409/230; 409/201; 408/239 A; 33/556; 425/375; 156/433

(58) Field of Classification Search .................... 29/560, 29/26 A, 26 R, 34 B; 483/16, 901; 901/41, 901/43, 44, 30; 425/375, 383; 156/433, 156/441, 425, 523, 574, 166, 173, 175; 409/202, 409/212, 144, 230, 201, 211, 216, 235; 408/239 A; 33/556, 503
See application file for complete search history.

(56) References Cited

U.S. PATENT DOCUMENTS

| | | | |
|---|---|---|---|
| 3,523,485 A * | 8/1970 | Klein | 409/202 |
| 4,133,711 A | 1/1979 | August et al. | |
| 4,699,683 A * | 10/1987 | McCowin | 156/353 |
| 4,967,947 A * | 11/1990 | Sarh | 483/16 |
| 5,223,072 A | 6/1993 | Brockman et al. | |
| 5,290,389 A | 3/1994 | Shupe et al. | |
| 5,624,364 A * | 4/1997 | Zimmer | 483/16 |
| 5,697,739 A * | 12/1997 | Lewis et al. | 409/230 |
| 5,698,066 A | 12/1997 | Johnson et al. | |
| 5,848,458 A | 12/1998 | Bullen | |
| 6,001,181 A * | 12/1999 | Bullen | 118/679 |
| 6,080,343 A | 6/2000 | Kaufman et al. | |
| 6,112,792 A | 9/2000 | Barr et al. | |
| 6,349,237 B1 | 2/2002 | Koren et al. | |
| 6,692,681 B1 | 2/2004 | Lunde | |
| 6,825,630 B2 * | 11/2004 | Katoh et al. | 409/230 |
| 6,968,883 B2 * | 11/2005 | Torres Martinez | 156/433 |
| 6,994,324 B2 | 2/2006 | Harvey et al. | |

(Continued)

FOREIGN PATENT DOCUMENTS

EP  3341253 A1 * 5/1984

(Continued)

OTHER PUBLICATIONS

Ermert, W., and Menges, G., "R U Reinforcing plastics with robots?", Plastics Engineering, May 1981.*

*Primary Examiner* — Erica E Cadugan
(74) *Attorney, Agent, or Firm* — Hovey Williams LLP

(57) ABSTRACT

A reconfigurable system having at least one detachable component and at least one detachable head assembly. The reconfigurable system may be a numerically controlled (NC) machine for manufacturing processes, such as milling or automatic fiber placement (AFP). The reconfigurable system may further comprise a gantry structure comprised of movably attached beams on which detachable components may be movably attached. The detachable components may include a concave component and a convex component. At least one detachable head assembly may be movably attached to at least one of the detachable components. The detachable components and head assemblies may be at least one of physically, electrically, and pneumatically connected to a connecting assembly attached to the gantry structure.

17 Claims, 5 Drawing Sheets

U.S. PATENT DOCUMENTS

| | | | |
|---|---|---|---|
| 7,127,825 B2 * | 10/2006 | McMurtry et al. | 33/556 |
| 7,641,461 B2 * | 1/2010 | Khoshnevis | 425/60 |
| 7,974,732 B2 * | 7/2011 | Wampler et al. | 700/179 |
| 2005/0209735 A1 | 9/2005 | Groppe | |
| 2006/0180264 A1 | 8/2006 | Kisch et al. | |
| 2006/0182557 A1 * | 8/2006 | Frauen et al. | 414/349 |

FOREIGN PATENT DOCUMENTS

| | | | |
|---|---|---|---|
| FR | 2579130 A | * | 9/1986 |
| JP | 58-028441 A | * | 2/1983 |

* cited by examiner

Head Assembly in
the Form of a
Cutter Spindle

*Fig. 9*

Head Assembly in
the Form of
a Probe

*Fig. 10*

MODULAR NUMERICALLY CONTROLLED SYSTEM

BACKGROUND

1. Field

The present invention relates to numerically controlled (NC) machines used in fields such as milling and manufacturing of structural and aerodynamic aircraft parts.

2. Related Art

Numerically controlled (NC) machines are used in a variety of manufacturing processes, including milling and automatic fiber placement (AFP) for manufacturing composite or metal parts for aircrafts and the like.

NC machines are traditionally custom designed for a specific task and contain a fixed number of structural components in a fixed configuration. Once the NC machine is built with a particular configuration, it can not have primary structural components, such as a movable beam supporting a material placement head, added or removed without retooling the machine, which can be a complicated and expensive process. As such, different machines are typically required for different manufacturing processes. At a manufacturing plant where multiple manufacturing processes are regularly carried out, using a different NC machine for each manufacturing process or each part to be tooled can be expensive.

Accordingly, there is a need for an improved NC machine that does not suffer from the problems and limitations of the prior art.

SUMMARY

The present invention is a modular, reconfigurable numerically controlled (NC) machine having detachable components for supporting and actuating at least one head assembly, thereby allowing for multiple configurations so that a variety of manufacturing processes may be performed or a variety of parts may be machined on a single piece of equipment.

In one embodiment of the invention, the reconfigurable NC machine comprises: at least one base beam; a horizontal beam supported by the base beam and movable along a first axis and a second axis relative to the base beam; a connecting assembly attachable to the horizontal beam and movable along a third axis which is different from the first and second axes; at least one detachable modular component movably attached to the connecting assembly; and at least one detachable head assembly movably attachable to at least one of the connecting assembly and the modular component. The modular component may have a linear, concave, or convex shape or surface. Multiple head assemblies may be attached to the modular component and may be movable relative to the modular component.

In various embodiments of the invention, the connecting assembly comprises a clamp operable to connect at least one of the head assembly and the modular component to the connecting assembly. Additionally, the clamp may connect the modular component or the head assembly to the connecting assembly physically, electrically, or pneumatically.

Another embodiment of the invention is a method of reconfiguring the reconfigurable NC machine. The method comprises the steps of attaching at least one base beam to the horizontal beam, the horizontal beam being movable along the first axis and the second axis relative to the base beam; attaching the connecting assembly to the horizontal beam, the connecting assembly being movable along the third axis different from the first and second axes; attaching a first detachable component to the connecting assembly; detaching the first detachable component from the connecting assembly; and attaching a second detachable component to the connecting assembly.

These and other important aspects of the present invention are described more fully in the detailed description below.

BRIEF DESCRIPTION OF THE DRAWINGS

An embodiment of the present invention is described in detail below with reference to the attached drawing figures, wherein:

FIG. 9 is a schematic representation of another head assembly according to the present invention.

FIG. 10 is a schematic representation of another head assembly according to the present invention.

DETAILED DESCRIPTION

Figure 1:
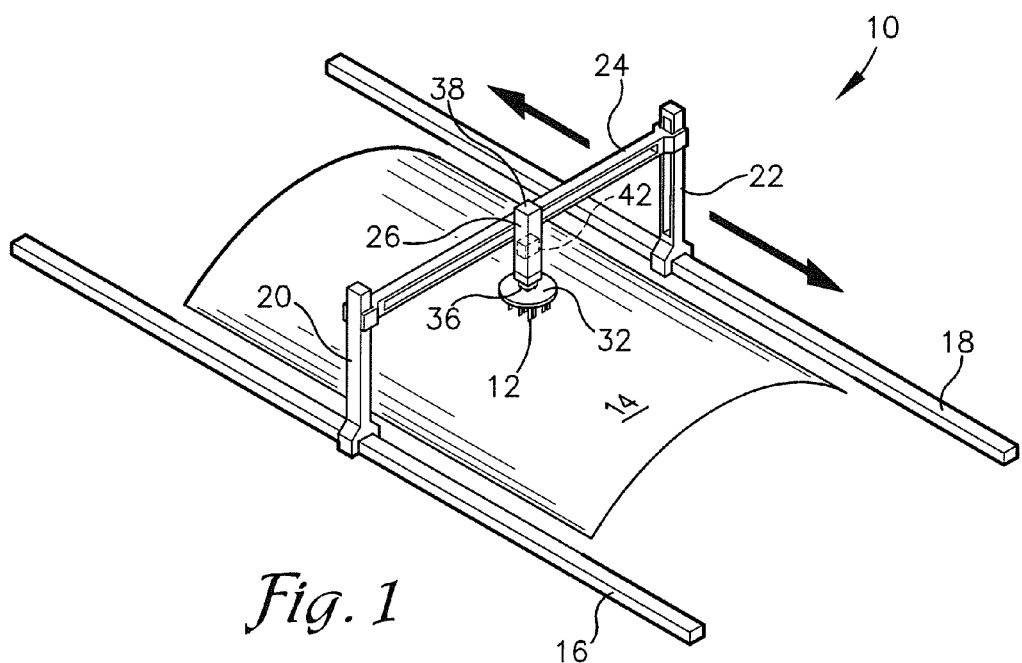
FIG. 1 is a perspective view of a reconfigurable system according to one embodiment of the present invention and shown interacting with a mold surface.

FIG. 1 illustrates a reconfigurable system 10 constructed in accordance with an embodiment of the present invention. The reconfigurable system 10 may be assembled in a plurality of configurations to be used for a variety of manufacturing processes, and is particularly suited for dispensing and compacting portions of a material 12 onto a mold surface 14, such as automatic fiber placement (AFP) onto a mandrel surface for manufacturing composite parts for aircrafts and the like. The reconfigurable system 10 may be a type of numerically controlled (NC) machine with a plurality of detachable and attachable structural components.

Referring to FIG. 1, an embodiment of the reconfigurable system 10 may comprise: a first and a second base beam 16,18; a first and a second upwardly extending beam 20,22 movably attached to the first and the second base beam 16,18; a horizontal beam 24 movably attached to the first and the second upwardly extending beam 20,22; a connecting assembly 26 movably attached to the horizontal beam 24; at least one of a plurality of detachable modular components 28,30 movably attachable to at least one of the beams and the connecting assembly 26; and at least one of a plurality of detachable head assemblies 32,34 movably attachable to at least one of the connecting assembly 26 and the modular components 28,30.

Figure 2:
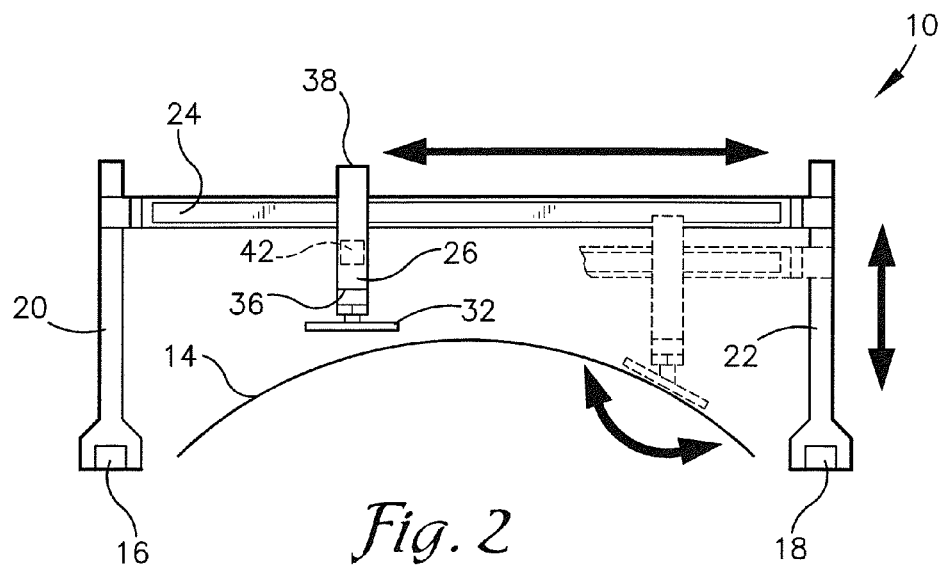
FIG. 2 is a front plan view of the reconfigurable system of FIG. 1, illustrating the movement of a connecting assembly, horizontal beam, and head assembly.

In one embodiment of the invention, the beams 16-24 form a gantry structure with the first base beam 16 parallel to the second base beam 18, the first upwardly extending beam 20 perpendicular to the first base beam 16, the second upwardly extending beam 22 perpendicular to the second base beam 18, and the horizontal beam 24 extending from the first upwardly extending beam 20 to the second upwardly extending beam 22. The first and second upwardly extending beams 20,22 may be movably attached to the first and second base beams 16,18, and the horizontal beam 24 may be movably attached to the first and second upwardly extending beams 20,22, as illustrated in FIGS. 1-2. Means for movably attaching the beams may be any means known in the art for slidably attaching one object to another, including tracks, rollers, and bearing ways.

Figure 8:
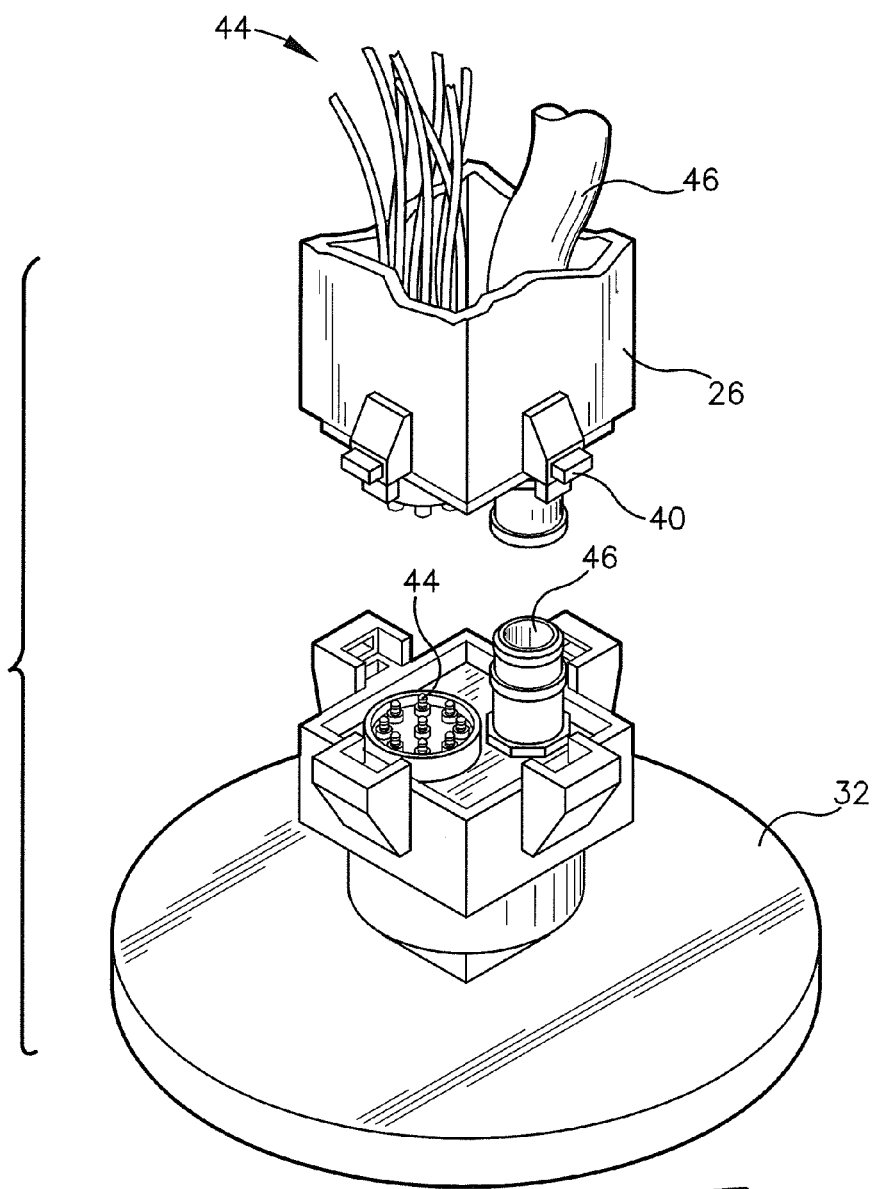
FIG. 8 is a fractured close-up perspective view of the connecting assembly and head assembly of FIG. 2.

Referring to FIGS. 3-7, in various embodiments, the connecting assembly 26 may be movably attached to the horizontal beam 24 and may have a first end 36 and a second end 38. The connecting assembly 26 may comprise a clamp 40 at its first end 36, as illustrated in FIG. 8, for attaching and detaching at least one of the modular components 28,30 or one of the head assemblies 32,34. The clamp 40 may be any type of connection apparatus known in the art for simultaneously making one or more of a physical, electrical, communications, and pneumatic connection between components. For example, appropriate male/female connections known in the art may be used to make any of physical, electrical, communications, and pneumatic connections, as illustrated in FIG. 8.

The modular components 28,30 may be curved in shape, including a concave modular component 28 and a convex modular component 30. The concave modular component 28 may be elongated and curved in a substantially concave shape relative to the mold surface 14. The convex modular component 30 may be elongated and curved in a substantially convex shape relative to the mold surface 14. Both the concave and convex modular components 28,30 are movably attachable to the connecting assembly 26. Alternatively, a single curved modular component may be movably attachable to the reconfigurable system 10 in a concave position, so that it curves toward the mold surface 14, or a convex position, so that it curves away from the mold surface 14. Other modular components of various shapes and sizes may be at least one of slidably, rotatably, and pivotally attached to the reconfigurable system 10 as required by a given application. For example, in an alternative embodiment of the invention, at least one of the modular components 28,30 may be elongated linear components that are not curved in shape (not shown). Each of the connecting assembly 26 and the detachable modular components 28,30 may additionally comprise means known in the art for slidably attaching one object to another, including tracks, rollers, and bearing ways.

The head assemblies 32,34 may be any head assembly known in the art, including material placement heads such as an AFP application head, cutter spindles, or probes. Different types of head assemblies may be interchangeably used on the reconfigurable system 10, thereby allowing a single system, such as a single NC machine, to machine a variety of parts or perform a variety of manufacturing processes. At least one head assembly 32,34 may movably attach to at least one of the connecting assembly 24, the concave modular component 28, and the convex modular component 30.

Figure 5:
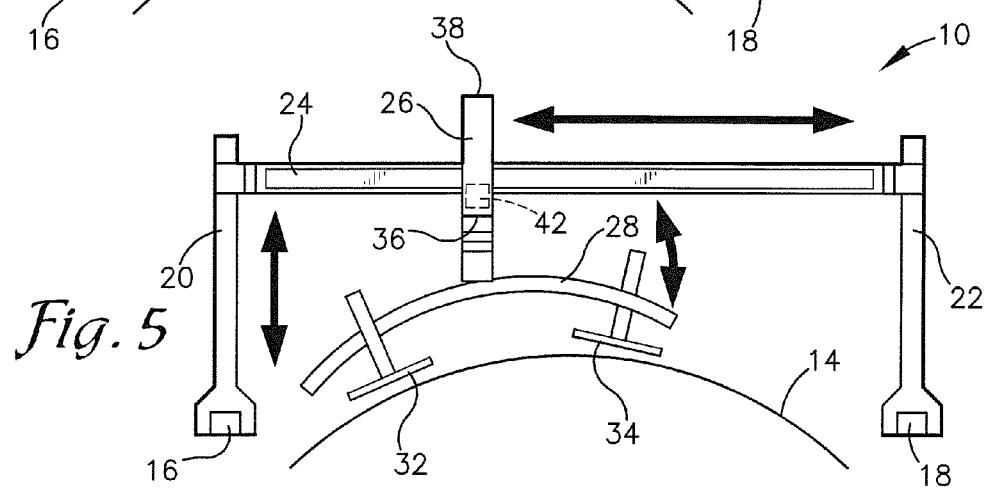
FIG. 5 is a front plan view of the reconfigurable system of FIG. 3 and illustrating the movement of the concave modular component.
Figure 6:
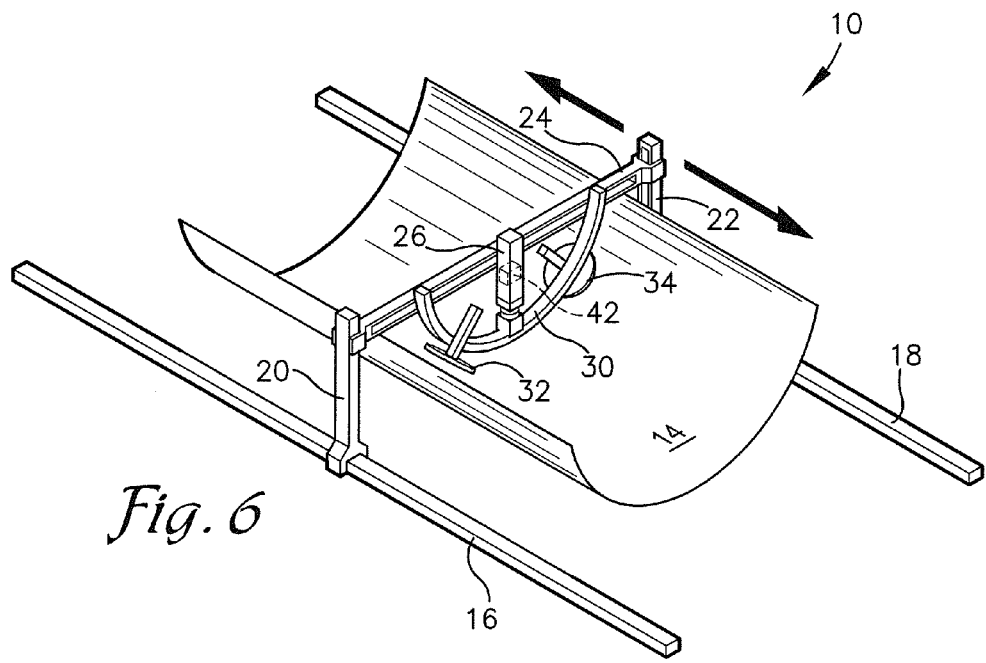
FIG. 6 is a perspective view of the reconfigurable system of FIG. 1 interacting with another mold surface and reconfigured with a convex modular component supporting two head assemblies.
Figure 7:
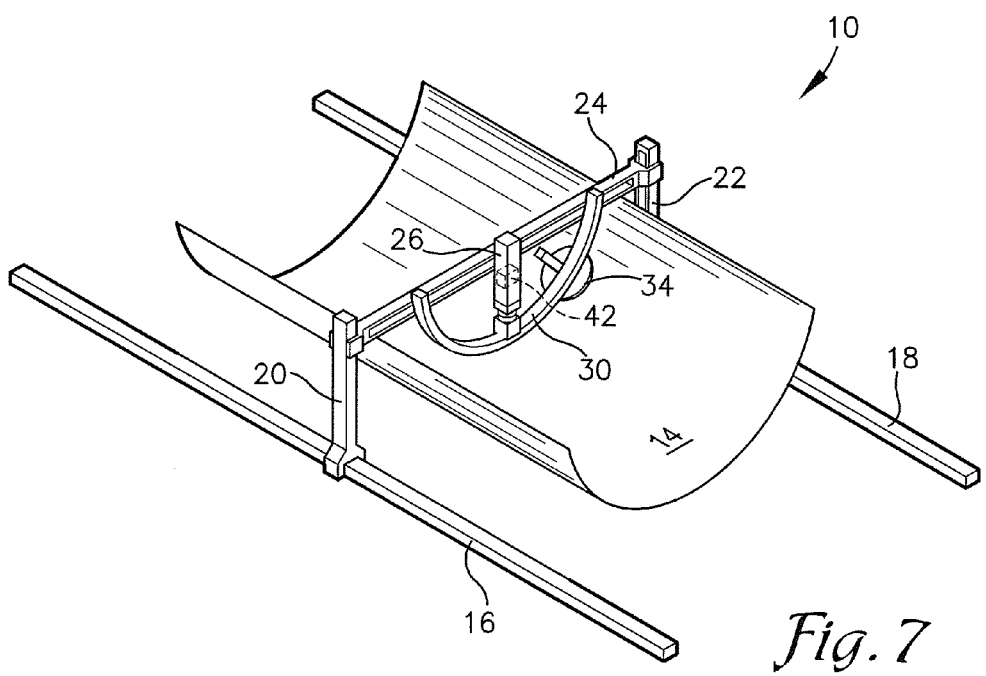
FIG. 7 is a perspective view of the reconfigurable system of FIG. 6 reconfigured with only one head assembly supported by the convex modular component.

The beams 16-24, connecting assembly 26, modular components 28,30, and head assemblies 32,34 may further comprise actuators known in the art, such as drive motors, for moving each component relative to each other. For example, an actuator 42 in the connecting assembly 26 may actuate the concave modular component 28 to pivot, as illustrated in FIG. 5. The actuator 42 may also actuate the convex modular component 30 or one of the head assemblies 32,34 to rotate in at least one plane when attached to the connecting assembly 26. The beams, connecting assembly 26, and modular components 28,30 may also comprise wires 44 for carrying electrical and communication signals and pneumatic or hydraulic tubes 46 to carry fluid for actuating the connecting assembly 26 and each modular component 28,30. Additionally, each component of the reconfigurable system 10 may comprise programmable logic control (PLC) and EPROM/memory storage devices.

Figure 4:
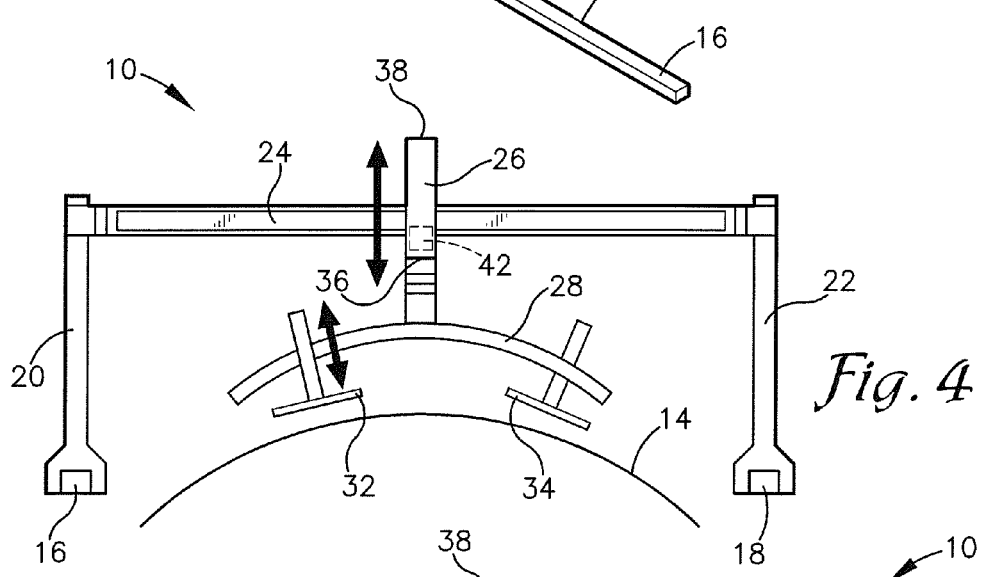
FIG. 4 is a front plan view of the reconfigurable system of FIG. 3.

In various embodiments, each beam of the reconfigurable system 10 may move relative to another beam. The upwardly extending beams 20,22 may move along a first axis relative to the base beams 16,18, as illustrated in FIG. 1. The horizontal beam 24 may move along the first axis relative to the base beams 16,18 and along a second axis relative to the base beams 16,18 and the upwardly extending beams 20,22, as illustrated in FIGS. 1-2. Additionally, the connecting assembly 26 may be movably attached to the horizontal beam 24 and may move along a third axis perpendicular to the first and second axes, as illustrated in FIG. 2. The third axis runs along the length of the horizontal beam 24. The connecting assembly 26 may also move perpendicularly relative to the third axis, as illustrated in FIG. 4.

The modular components 28,30 and the head assemblies 32,34 may be at least one of interchangeably and cooperatively attached to the horizontal beam 24 by the connecting assembly 26. For example, one of the head assemblies 32,34 may be attached directly to the connecting assembly 26 or attached to the modular component 28, which may be attached to the connecting assembly.

Figure 3:
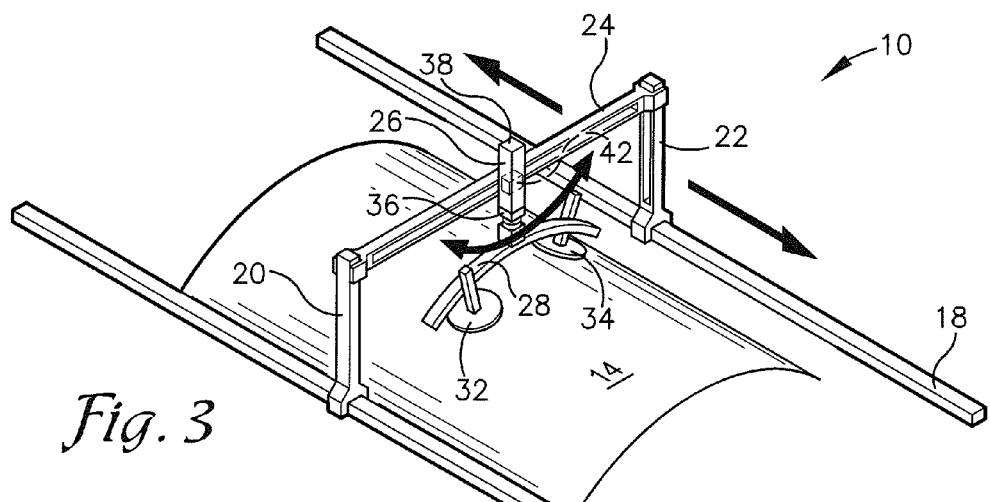
FIG. 3 is a perspective view of the reconfigurable system of FIG. 1 shown interacting with the mold surface and reconfigured with a concave modular component supporting two head assemblies.

The first end 36 of the connecting assembly 26 may be at least one of slidably, rotatably, and pivotally attached to one of the modular components 28,30 and one of the head assemblies 32,34. Specifically, the modular component 28 may rotate in at least one plane when attached to the connecting assembly 26, and the modular component 30 may rotate in at least one plane when attached to the connecting assembly 26, as illustrated in FIG. 3 and FIG. 5. Additionally, at least one of the head assemblies 32,34 may rotate in at least one plane when attached to the connecting assembly 26. When attached to the modular components 28,30, the head assemblies 32,34 may move perpendicularly relative to the curve of the concave or convex modular components 28,30, as illustrated in FIG. 4. The head assemblies 32,34 may also move along the length of the concave and convex modular components 28,30 when attached to one of the modular components 28,30.

A method for reconfiguring the reconfigurable system 10 may comprise attaching a first component, such as the concave modular component 28, the convex modular component 30, or one of the head assemblies 32,34, to the connecting assembly 26. The method may further comprise detaching the first component from the connecting assembly 26 and attaching a second component, such as the concave modular component 28, the convex modular component 30, or one of the head assemblies 32,34, to the connecting assembly 26. The second component may be a different component than the first component.

In one embodiment of the invention, the method may comprise attaching one of the modular components 28,30 to the connecting assembly 26. The method may further comprise attaching both of the head assemblies 32,34 to opposing sides of the modular component 28,30 that is attached to the connecting assembly 26. Additionally, the method may comprise detaching head assembly 34 from the modular component 28,30 that is attached to the connecting assembly 26, resulting in, for example, the configuration illustrated in FIG. 7.

Although the invention has been described with reference to the embodiments illustrated in the attached drawings, it is noted that equivalents may be employed and substitutions made herein without departing from the scope of the invention as recited in the claims. Particularly, it is noted that beams and other components may be omitted without departing from the scope of the invention as recited in the claims. For example, the reconfigurable system 10 may simply comprise the first base beam 16 supporting the horizontal beam 24, which may be movable relative to the first base beam 16; the connecting assembly 26 movably attached to the horizontal beam; and at least one detachable modular component 28,30 movably attachable to at least one of the beams.

Having thus described an embodiment of the invention, what is claimed as new and desired to be protected by Letters Patent includes the following:

1. A modular material placement system for dispensing and compacting portions of a material onto a surface, the modular material placement system comprising:
   a first beam;
   a second beam supported by the first beam and movable along a first axis, and also movable along a second axis relative to the first beam;
   a connecting assembly attachable to the second beam, movable along a third axis which is different from the first and second axes, and having a clamping arrangement forming a first connection point at one end of the connecting assembly;
   a first component having an end that is selectively clampable by the clamping arrangement at the first connection point of the connecting assembly, wherein the first component is movable relative to the connecting assembly when the one end of the first component is clamped by the clamping arrangement;
   a second component having an end that is selectively clampable by the clamping arrangement, as an alternative to the first component, at the first connection point of the connecting assembly, wherein the second component is movable relative to the connecting assembly when the second component is clamped by the clamping arrangement; and
   a material placement head assembly having an end that is selectively clampable by the clamping arrangement, as an alternative to the first and second components, at the first connection point of the connecting assembly, and wherein the material placement head assembly is configured to be movably attached to the first component for relative movement of the material placement head assembly relative to the first component when the one end of the first component is clamped by the clamping arrangement, and wherein the material placement head assembly is configured to be movably attached to the second component for relative movement of the material placement head assembly relative to the second component when the one end of the second component is clamped by the clamping arrangement, wherein the material placement head assembly is movable relative to the first and second beam when attached to the connecting assembly.

2. The system of claim 1, wherein at least one of the first component, second component, and material placement head assembly are pivotable relative to the connecting assembly.

3. The system of claim 1, wherein at least one of the first and second components is concave in shape relative to the surface onto which the material placement head assembly dispenses and compacts material.

4. The system of claim 1, wherein at least one of the first and second components is convex in shape relative to the surface onto which the material placement head assembly dispenses and compacts material.

5. The system of claim 1, wherein the material placement head assembly is pivotable relative to each of the first and second components, when the material placement head assembly is attached to the first and second components, respectively.

6. The system of claim 1, wherein an additional material placement head assembly is movably attached to the first component.

7. The system of claim 1, wherein the connecting assembly further comprises an actuator.

8. The system of claim 7, wherein the actuator is operable to cause a pivoting movement.

9. The system of claim 7, wherein the clamping arrangement simultaneously forms one or more of a physical, electrical, communications, and pneumatic connection between the connecting assembly and the one of the first component, the second component, and the material placement head assembly whose end is clamped by the clamping arrangement.

10. The system of claim 7, wherein the actuator is operable to move, relative to the connecting assembly, the one of the material placement head assembly, the first component, and the second component whose end is clamped by the clamping arrangement.

11. The system of claim 1, wherein an additional material placement head assembly is movably attached to the second component.

12. A reconfigurable system for performing a manufacturing operation on a surface, the system comprising:
   a gantry structure, including
      a first base beam,
      a second base beam parallel to the first base beam,
      a first upwardly extending beam attached to the first base beam and movable parallel to a first axis,
      a second upwardly extending beam attached to the second base beam and movable parallel to the first axis, and
      a horizontal beam extending from the first upwardly extending beam to the second upwardly extending beam and movable along a second axis perpendicular to the first axis and parallel to the upwardly extending beams;
   a connecting assembly having a first end and a second end, wherein the connecting assembly is movable along and relative to the horizontal beam, and wherein the connecting assembly has a clamping arrangement at the first end;
   a concave component in the form of an elongated curved beam that is concavely curved with respect to the surface when the surface is in a position to have the manufacturing operation performed thereon by the reconfigurable system, a convex side of the curved beam having a member that is selectively clampable by the clamping arrangement at the first end of the connecting assembly, wherein the concave component is movable relative to the connecting assembly when the member of the convex side of the concave component is clamped by the clamping arrangement;
   a convex component in the form of an elongated curved beam that is convexly curved with respect to the surface when the surface is in the position to have the manufacturing operation performed thereon by the reconfigurable system, a concave side of the curved beam having a member that is selectively clampable by the clamping arrangement, as an alternative to the concave component, at the first end of the connecting assembly, wherein the convex component is movable relative to the connecting assembly when the member of the concave side of the convex component is clamped by the clamping arrangement; and a head assembly for performing a manufacturing operation on the surface, the head assembly having an end that is selectively clampable by the clamping arrangement, as an alternative to the concave and convex components, and wherein the head assembly is configured to be movably attached to the concave component when the member of the convex side of the concave component is clamped by the clamping arrangement, and wherein the head assembly is configured to be movably attached to the convex component when the member of the concave side of the convex component is clamped by the clamping arrangement.

13. The reconfigurable system of claim 12, wherein the head assembly is chosen from the group consisting of a material placement head, a cutter spindle, and a probe.

14. The reconfigurable system of claim 12, wherein the one of the concave component, convex component, and head assembly that is being clamped by the clamping arrangement is attached physically, electrically, and pneumatically to the connecting assembly.

15. The reconfigurable system of claim 12, wherein the head assembly, the concave component, and the convex component are movable slidably, rotatably, and pivotally when attached to the connecting assembly.

16. A material placement system for dispensing and compacting material onto a surface, the material placement system comprising:
a gantry structure, further comprising:
a first base beam,
a second base beam parallel to the first base beam,
a first upwardly extending beam extending upwardly from and attached to the first base beam and movable along a first axis,
a second upwardly extending beam extending upwardly from and attached to the second base beam and movable along a second axis parallel to the first axis, and
a horizontal beam extending from the first upwardly extending beam to the second upwardly extending beam and movable along a third axis parallel to the upwardly extending beams;
a connecting assembly having a clamp at one end, wherein the connecting assembly is movable along and relative- to the horizontal beam;
a concave component in the form of an elongated curved beam that is concavely curved with respect to the surface onto which the material placement system dispenses and compacts material, a convex side of the curved beam having a member that is selectively clampable by the clamp of the connecting assembly, wherein the concave component is movable relative to the connecting assembly when the member of the convex side of the concave component is clamped by the clamp;
a convex component in the form of an elongated curved beam that is convexly curved with respect to the surface onto which the material placement system dispenses and compacts material, a concave side of the curved beam having a member that is selectively clampable by the clamp of the connecting assembly, as an alternative to the concave component, wherein the convex component is movable relative to the connecting assembly when the member of the concave side of the convex component is clamped by the clamp; and a material placement head for dispensing and compacting material onto the surface, wherein the material placement head has an end that is selectively clampable by the clamp, as an alternative to the concave and convex components, and wherein the material placement head is configured to be movably attached to the concave component when the member of the convex side of the concave component is clamped by the clamp, and wherein the material placement head is configured to be movably attached to the convex component when the member of the concave side of the convex component is clamped by the clamp.

17. A reconfigurable apparatus for performing a manufacturing operation on a surface, the apparatus comprising:
a first beam;
a second beam, wherein the second beam is supported by the first beam and movable along a first axis, and is also movable along a second axis relative to the first beam;
a connecting assembly having a clamp at one end of the connecting assembly, wherein the connecting assembly is attachable to the second beam and movable along a third axis which is different from the first and second axes;
a first component having an end that is selectively clampable by the clamp of the connecting assembly, wherein the first component is movable relative to the connecting assembly when the one end of the first component is clamped by the clamp;
a second component having an end that is selectively clampable by the clamp of the connecting assembly, wherein the second component is movable relative to the connecting assembly when the one end of the second component is clamped by the clamp; and
a head assembly for performing a manufacturing operation on the surface, the head assembly having an end that is selectively clampable by the clamp, as an alternative to the first and second components, wherein the head assembly is configured to be movably attached to the first component for relative movement of the head assembly relative to the first component when the one end of the first component is clamped by the clamp, and wherein the head assembly is configured to be movably attached to the second component for relative movement of the head assembly relative to the second component when the one end of the second component is clamped by the clamp, and wherein the head assembly is movable relative to the first and second beam when attached to the connecting assembly,
wherein the clamp connects the one of the first component, the second component, and the head assembly that has the end that is being clamped by the clamp at least one of physically, electrically, and pneumatically to the connecting assembly.

* * * * *